Patented Mar. 31, 1925.

1,532,053

UNITED STATES PATENT OFFICE.

GUY HILL, OF WINNEMUCCA, NEVADA, ASSIGNOR OF ONE-THIRD TO F. E. GORHAM AND ONE-THIRD TO A. E. SYKES, BOTH OF WINNEMUCCA, NEVADA.

STOP-LEAK COMPOSITION FOR RADIATORS.

No Drawing.   Application filed September 25, 1924.  Serial No. 739,925.

*To all whom it may concern:*

Be it known that I, GUY HILL, a citizen of the United States, residing at Winnemucca, county of Humboldt, and State of Nevada, have invented certain new and useful Improvements in Stop Leak Compositions for Radiators; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in stop leak compounds for radiators.

It often happens that automobile radiators develop small leaks which are extremely difficult to locate and which even when located are difficult, if not almost impossible to solder. In such cases it is very desirable to be able to stop the leak in some other way, as by mixing with the water a substance or compound that will cause the opening thru which the water escapes to close up.

I have found that radiator leaks may be quickly and effectively stopped by a composition which I have invented and which can be cheaply prepared from simple and inexpensive ingredients.

The compound, which forms the subject of my present invention, is formed by taking one pound of rabbit brush (bigeloria graveoleus) and one quarter (¼) pound of Russian thistle (Salsola tragus) and boiling the same in water for one hour. The quantity of water used should be such that the liquid removed, after the boiling is over, amounts to about one quart. As there is considerable evaporation, the quantity of water to which the rabbit brush and the Russian thistle is added must be greater than one quart, or else water must be added to compensate for the loss caused by evaporation. After boiling, the liquid is removed by straining and pressing. To this liquid extract I add fourteen ounces of soap (sapo) and one pint of cereal meal. The meal may be wheat bran, alfalfa meal, or almost any ordinary cereal meal such as flour middling or similar meals. The mixture is now boiled for twenty minutes after which it is evaporated and ground to a powder. This powder is added to the water in the radiator and has the property of quickly and effectively stopping leaks. I attribute the extraordinary efficiency of this composition to the fact that it contains the extract from the rabbit brush (bigeloria graveoleus) whose latex has properties resembling that of the rubber tree. The Russian thistle also has properties which peculiarly adapts it to this use while the soap appears to make the extracts more effective. The cereal meal furnishes solid bulk to the compound and serves to fill the holes and to assist in closing them. The cereal meal is especially valuable for closing the larger openings, which are gradually closed by the accumulation of small particles from the leak compound.

Having now described my invention, what I claim as new is:

1. A stop leak composition for radiators comprising extract of bigeloria graveoleus.

2. A stop leak composition for radiators comprising extract of bigeloria graveoleus and extract of Salsola tragus.

3. A stop leak composition for radiators comprising extract of bigeloria graveoleus and soap.

4. A stop leak composition for radiators comprising extract of bigeloria graveoleus and extract of Salsola tragus and soap.

5. A stop leak composition for radiators comprising extract of bigeloria graveoleous and extract of salsola tragus and cereal meal and soap.

6. The method of making a stop leak composition for radiators which consists in boiling one pound of bigeloria graveoleus and one quarter (¼) pound of Salsola tragus in one quart water for one hour, removing the liquid extract from the vegetable matter, adding fourteen ounces (14) of soap and a pint of cereal meal, boiling the mixture for twenty minutes, evaporating to dryness and then grinding to a powder.

In testimony whereof I affix my signature.

GUY HILL.